UNITED STATES PATENT OFFICE.

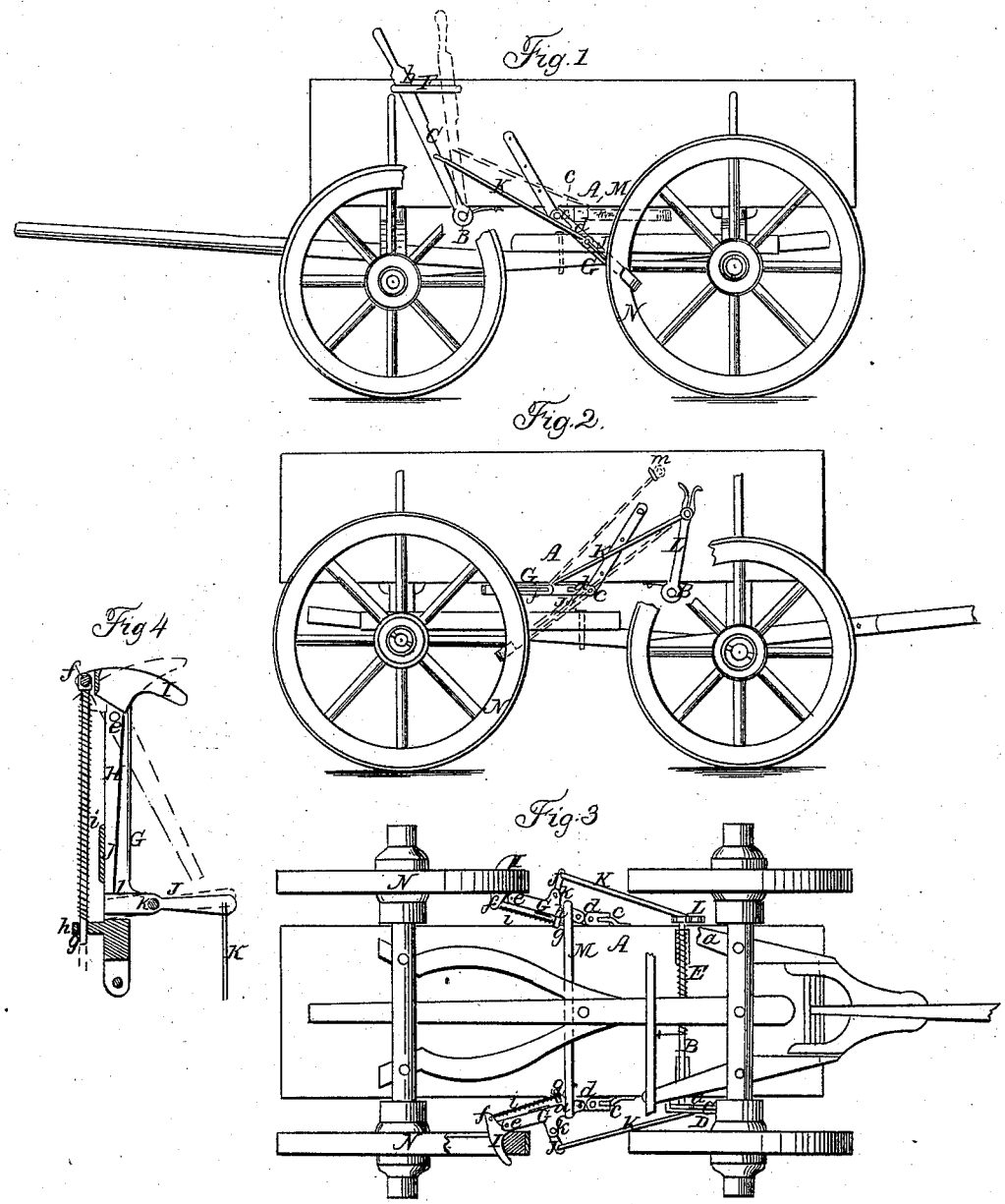

J. H. LEE, OF LEAVENWORTH, KANSAS.

IMPROVEMENT IN LOCKS FOR WHEEL-VEHICLES.

Specification forming part of Letters Patent No. 39,581, dated August 18, 1863.

*To all whom it may concern:*

Be it known that I, J. H. LEE, of Leavenworth, in the county of Leavenworth and State of Kansas, have invented a new and Improved Lock for Wheel-Vehicles; and I do hereby declare that the following is a full, clear, and exact description of the same, reference being had to the accompanying drawings, making a part of this specification, in which—

Figure 1 is a side view of a wheel-vehicle with my invention applied to it. Fig. 2 is also a side view of the same, the side opposite to that shown in Fig. 1; Fig. 3, a plan or top view of the same; Fig. 4, a detached view of the hook and parts directly connected therewith.

Similar letters of reference indicate corresponding parts in the several figures.

This invention consists in the employment or use of one or more hooks, constructed, arranged, and applied to a wheel-vehicle in such a manner that the driver from his seat may, by a simple manipulation, cause the hook or hooks to engage with the back wheels of the vehicle, so as to stop the rotation of the former, and also readily detach the hook or hooks form the wheels when necessary.

The invention is an improvement on the chain and hook originally used for locking the wheels of vehicles in descending eminences, and which were far more efficient than the modern brakes for checking the descent of a vehicle, but were abandoned on account of the trouble of getting in and out of a vehicle to lock and unlock the wheels.

The object of the within-described invention is to obviate this difficulty and render the adjustment of the hook or hooks to lock and unlock the wheels equally as easy as the adjustment of the hand brakes now in general use.

To enable those skilled in the art to fully understand and construct my invention, I will proceed to describe it.

A represents a wagon, which may be constructed in the usual way, and therefore does not require a minute description. Underneath the body of the wagon, near its front end, there is placed transversely a shaft, B, which is allowed to turn freely in its bearings $a$, and has a lever, C, attached to one end of it, which extends up by the side of the wagon-body and within convenient reaching distance of the driver. The upper part of the lever C is fitted within a guide, D, and on the shaft B there is fitted a spiral spring, E, which has a tendency to keep the lever C in contact with the back end of the guide D, as shown in red in Fig. 1. A horizontal bar, F, is attached to the side of the wagon-body and directly above the guide D, said bar having a shoulder, $b$, near its front end, to hold or retain the lever C when the latter is shoved forward in the front part of the guide D, as shown in black in Fig. 1.

To the sides or bottom of the wagon-body there are attached by joints or hinges $c$ bars G. These joints or hinges $c$ admit of the bars G working in vertical planes, and each bar G is provided with a joint, $d$, which admits of said bars working in horizontal planes. (See more particularly Fig. 3.) The bars G are slotted horizontally nearly their whole length, and in the slot of each bar there is secured by a pin, $e$, a rod, H. These rods H have hooks I formed on their outer ends, and to the back end of each hook there is attached by a pivot, $f$, a rod, $g$. These rods $g$ work through guides $h$ at the backs of the bars G, and each rod has a spiral spring, $i$, upon it, which springs have a tendency to keep the front parts of the hooks I at right angles with the bars G and the rods H within the slots in said bars against stops $j$, as will be fully understood by referring to Fig. 1. In the front part of each bar G there is secured by a pin, $k$, an arm, J, and the inner parts of these arms have shoulders $l$ on them to catch the inner ends of the rods H and hold the hooks I in proper position or at right angles with the bars G. The outer ends of the arms J are connected by rods K, one to the lever C and the other to an arm, L, which is attached to the end of the shaft B, opposite to the end where the lever C is attached. This arm L extends up by the side of the wagon-body, and has its upper end forked to receive the front end of its rod K, as shown in Fig. 2. This rod K may be detached from the arm L when desired, and held up free from it by a hook, $m$, at the side of the wagon-body.

M is a spring attached to the bottom of the wagon-body, and upon the ends of which the bars G G rest. This spring may be of metal or a suitable elastic wood.

The operation is as follows: When the lever

C is disengaged from the shoulder $b$ of the bar F, the spring E on shaft B, as before stated, will have a tendency to keep the lever C in contact with the back part of the guide D, and the hooks I will be back or free from the back wheels, N, of the wagon and said wheels allowed to rotate freely on their axle. In descending an eminence, or at any time when said wheels require to be locked or prevented from rotating, the driver shoves forward the upper part of lever C, and thereby causes the rods K K of the lever C and arm L to throw the hooks I behind the rims of the wheels N, as shown in black in Figs. 1 and 3 and in blue in Fig. 2, and the wheels N will turn until a spoke strikes against the hooks and draws them down to an angle of about forty-five degrees, at which point the wheels will be locked and effectually prevented from rotating. The pull of the rods K on the arms J keeps the inner ends of the latter in contact with the ends of the rods H, the latter bearing against the shoulders $l$ of arms J, which prevents the rods H from turning on their pins $e$ and the hooks I from being casually disengaged from the wheels. In order to disengage the hooks I from the wheels N, the driver simply releases the lever C from the shoulder $b$ of the bar F, and the arms J in being released from the pull of the rods K instantly release the rods H of the hooks I, which are thrown back free from the rims of the wheels by the pressure of the latter, and at the same time the bars G are thrown back from the wheels by the spring E on shaft B, the springs $i$ on the rods $g$ throwing the hooks I into their original position, so that the rods H will pass within the slots in the bars G, and the spring M turning up the bars G to their original position, so that the parts will be in readiness to be moved or adjusted as before for a succeeding locking of the wheels when necessary. This yielding movement of the hooks I, which is effected by their attachment to the rods H, and the arrangement of the latter with the arms J and springs $i$, is an essential feature of the invention, as without it the hooks could not be liberated from the wheels N, owing to the pressure of the latter on the former.

I would remark that when only one hook is required to be operated, so as to lock but one wheel, the rod K is detached from the arm L and fitted or suspended on the hook $m$.

Having thus described my invention, what I claim as new, and desire to secure by Letters Patent, is—

1. The employment or use of one or two bars, G, attached to the body of the vehicle, and arranged with joints in such a manner that they may be moved in both a vertical and horizontal plane, and provided with hooks I, which, by the movements of the bars aforesaid, may be engaged with or detached from the wheels in order to lock and unlock the same, as set forth.

2. The manner of attaching or arranging the hooks I with the bars G, so as to admit of the former being readily released from the wheels—to wit, by having the hooks I attached to rods H, which are pivoted in slots in the bars G, and having springs $i$ connected with the hooks and arms J, or any suitable clicks to engage with the rods H, substantially as set forth.

3. The shaft B, provided with the spring E, the lever C, and arm L, with the rods K and arms J, in combination with the bars G, spring M, and rods H, provided with the hooks I, all arranged to operate substantially as and for the purpose herein set forth.

J. H. LEE.

Witnessess:
   J. W. COOMBS,
   M. L. PARTRIDGE.